(12) United States Patent
Price et al.

(10) Patent No.: US 6,783,000 B1
(45) Date of Patent: Aug. 31, 2004

(54) PORTABLE DISC HOLDERS

(76) Inventors: Robin James Price, 3 Highdale Ave., Clevedon, North Somerset (GB), BS21 7LZ; Christian Egner, 2 Woodlands Road, Clevedon, North Someset (GB), BS21 7QD ( * ) Notice: Subject to any disclaimer, the term of this patent is extended or adjusted under 35 U.S.C. 154(b) by 0 days.

(21) Appl. No.: 10/030,948

(22) PCT Filed: Jul. 19, 2000

(86) PCT No.: PCT/GB00/02772

§ 371 (c)(1),
(2), (4) Date: May 7, 2002

(87) PCT Pub. No.: WO01/18812

PCT Pub. Date: Mar. 15, 2001

(30) Foreign Application Priority Data

Jul. 20, 1999 (GB) .............................................. 9916996

(51) Int. Cl.[7] .............................................. B65D 85/57
(52) U.S. Cl. .................................... 206/308.1; 206/311
(58) Field of Search ...................... 206/308.1, 309–313, 206/449, 454, 477, 478, 480, 483; 40/710, 725

(56) References Cited

U.S. PATENT DOCUMENTS

| | | | | |
|---|---|---|---|---|
| 1,544,139 A | * | 6/1925 | Duclos ........................ 40/710 |
| 4,473,153 A | * | 9/1984 | Colangelo .................... 206/312 |
| 4,685,785 A | * | 8/1987 | Mundt et al. ................ 353/120 |
| 5,246,107 A | * | 9/1993 | Long et al. .................. 206/309 |
| 5,392,913 A | * | 2/1995 | Merrick ....................... 206/454 |
| 5,600,628 A | * | 2/1997 | Spector ....................... 369/291 |
| 5,732,818 A | * | 3/1998 | Koehn ....................... 206/308.1 |
| 5,749,463 A | * | 5/1998 | Collins ..................... 206/308.1 |
| 5,772,022 A | * | 6/1998 | Renna ......................... 206/312 |
| 5,788,069 A | * | 8/1998 | Calhoun, III et al. ........ 206/312 |
| 5,816,394 A | * | 10/1998 | O'Brien et al. .......... 206/308.1 |
| 5,884,761 A | * | 3/1999 | Gelardi et al. ........... 206/308.1 |
| 6,012,574 A | * | 1/2000 | Ennis ....................... 206/308.1 |
| 6,044,969 A | * | 4/2000 | Denize et al. ........... 206/308.1 |
| 6,112,901 A | * | 9/2000 | Noga et al. ................. 206/723 |
| 6,276,523 B2 | * | 8/2001 | Sanders .................... 206/308.1 |

* cited by examiner

*Primary Examiner*—Shian T. Luong
(74) *Attorney, Agent, or Firm*—Skinner and Associates

(57) ABSTRACT

A portable disc holder comprises a frame member 1 adapted to circumferentially surround a disc at the disc's edges and being at least partially in contact therewith to restrain planar movement of the disc when held in the frame member, the frame member 1 including flange means 7, 8 for preventing or inhibiting planar movement of the disc, and remote from the flange means 7, 8 on a generally opposite portion of the frame member 1 a resiliently moveable means 7, 8 adapted to restrain planar movement of an adjacent edge portion of the disc when the disc is mounted in the frame member 1, the resiliently moveable flange means 7, 8 permitting entry of the disc into the frame member 1 following resilient deformation of the flange.

6 Claims, 2 Drawing Sheets

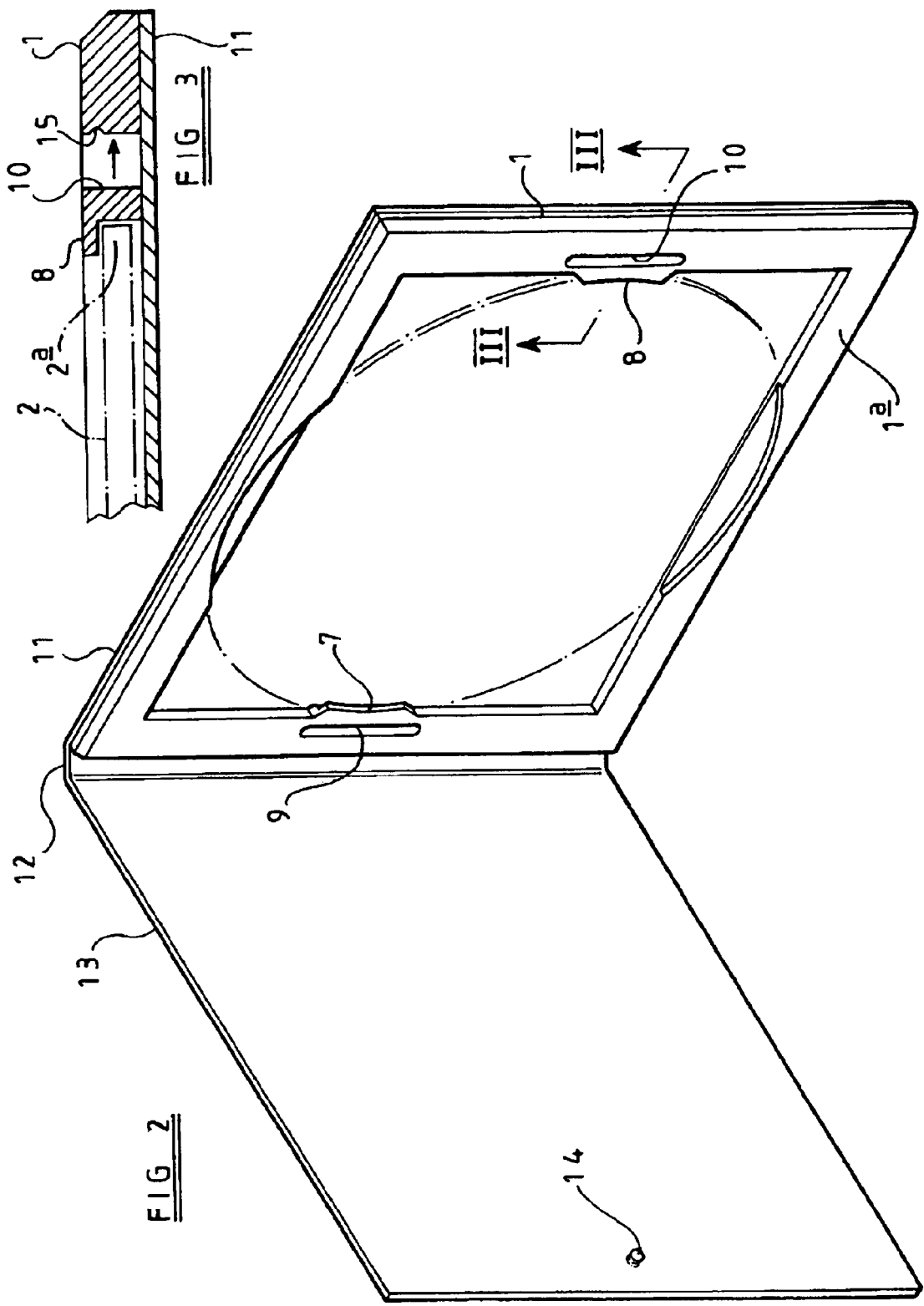

PORTABLE DISC HOLDERS

Figure 1:
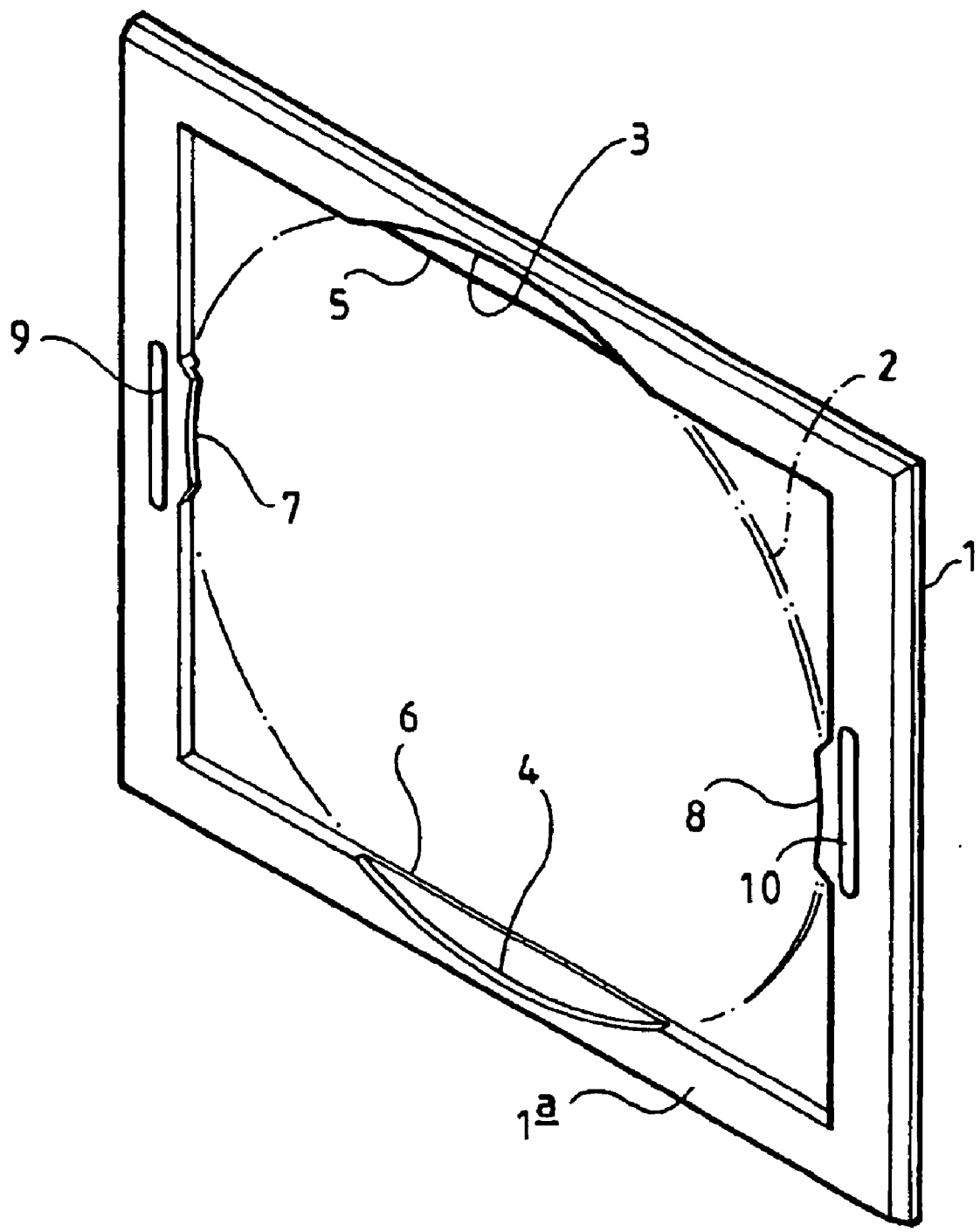

This invention relates to portable disc holders of the type which are typically used to hold or contain compact discs, or CD's as they are more familiarly known.

Compact disc holders fall generally into two types, the first being in the form of a rectangular plastics box which includes a hinged lid or front cover over a rectangular housing including a back cover for containing the disc. The "height" of the disc holder relative to the length of the hinge is slightly in excess of the diameter of the disc, whereas the "width" of the disc holder is greater, as it must include the width of the hinge itself. Although these kinds of disc holder are in common use and efficiently protect compact discs from damage, nevertheless they are unsuitable for transporting such discs by post as they are generally heavy and can become broken during transport.

The second type of portable disc holders available are typically made from cardboard, as is shown in patent number GB2319242B, and include a back cover onto which are bonded sheets of shaped cardboard having a central aperture corresponding generally to the external diameter of the disc to be held. A front cover is hingedly connected to the back cover to protect the otherwise exposed face of the disc. This type of disc holder is generally fighter than a plastics one and therefore is preferable for transportation by post, but a major disadvartage arises by the fact that, in order to protect all edges of the disc from accidental damage, the overall "height" of the holder is greater such that the disc holder is essentially square, as opposed to being rectangular as in the plastics version. This means, in turn, that such relatively lightweight compact disc holders cannot fit into standard sized compact disc storage facilities and for this reason they are generally only used for demonstration discs sent by post or included with magazines etc., rather than being used as a substitute for the more traditional plastics holder commonly used to house all kinds of compact discs, including those for playing computer games.

It is an object of the present invention to provide a lightweight portable disc holder in the aforementioned disadvantages are obviated.

According to the invention there is provided a portable disc holder, the holder comprising or including a frame member adapted to circumferentially surround a disc at the disc's edges and being at least partially in contact therewith to restrain planar movement of the disc when held in the frame, the frame member including integral flange means into which at least part of an outer edge of the disc can be inserted preventing or inhibiting planar movement of the disc in that region, and remote from the flange means on a generally opposite portion of the frame an integral resiliently moveable flange means adapted to restrain planar movement of an adjacent edge portion of the disc when the disc is mounted in the frame, the resiliently moveable flange means permitting entry of that portion of the disc into the frame following resilient deformation of the flange.

Conveniently, the flange means remote from the resiliently moveable flange means is also resiliently moveable, and each comprise an integrally formed inwardly facing flange relative to the frame, behind which is a slot to permit each flange to be pushed radially outwardly relative to the orientation of a disc to be stored to permit entry of the disc into the frame. Alternatively, the resiliently moveable flange means may be arranged to move angularly relative to the frame member to permit entry or removal of the disc.

Conveniently, the frame member has a back cover and a hinged front cover, which hinged front cover may have a projection at or near a leading edge thereof cooperable with a correspondingly shaped recess in the frame such that the front cover can be closed by a snap fit and released in the same way.

In an alternative embodiment of the invention, the disc holder is provided with a separate sleeve into which the disc holder and a disc may be inserted.

The invention will now be described, by way of example only, with reference to the accompanying drawings in which:

FIG. 1 is a perspective view of a portable disc holder according to a first embodiment of the invention and showing a disc stored therewithin in broken outline, FIG. 2 is a perspective view of a portable disc holder according to a second embodiment of the invention including a back cover and a hinged front cover, and FIG. 3 is a sectional detail view along the axis II—II of FIG. 2.

Referring firstly to FIG. 1 a portable disc holder according to this embodiment of the invention comprises a rectilinear plastics frame member (1) into which may be inserted and stored a compact disc (2) shown in broken outline. This is achieved by the disc (2) being restrained by a pair of oppositely disposed part circular recesses (3,4) in the front face (1a) of the frame member (1) and being of circumference corresponding to the external circumference of the disc (2), which recesses (3,4) each define a corresponding web portion (5,6) of the frame member (1).

A pair of oppositely disposed flanges (7,8) project inwardly relative to the centre of the disc (2) such that the disc (2) is captured within the recesses (3,4).

Behind each of the flanges (7,8) as respective slots (9,10) which therefore permit resilient deformation of the flanges (7,8) radially outwardly in a manner to be described.

Turning now to FIG. 2, there is shown a view of a portable disc holder substantially identical to that of FIG. 1 but including a rear cover (11) secured to the rear of the frame (1), such as by adhesive, a spine portion (12) which acts as a hinge and to which is attached the front cover (13) which may therefore be closed to entirely cover the front (1a) of the frame member (1).

Protruding from the inside of the front cover (13) near to the leading edge thereof is a part spherical projection (14) which, when the front cover (13) is closed, enters the slot (10) and, as can be seen more clearly with reference to FIG. 3, engages by means of a snap fit with a correspondingly shaped recess (15) so that the portable disc holder can be closed or opened as required.

As can be seen more clearly with reference to FIG. 3, the flange (8) covers an edge portion (2a) of the disc (2), thereby restraining the latter from planar movement out of the frame (1). However, because the flange (8) can be pushed in the direction shown arrowed in FIG. 3 by virtue of the presence of the slots (10) the disc (2) can be inserted and removed from the fame (1) by being pressed, respectively, into or out of the frame (1), thereby forcing the flanges (7,8) apart in order to permit insertion or removal as the case may be.

Rather than being designed to permit insertion or removal of the disc by forcing the flanges (7, 8) apart, one or more of the flanges may be angularly moveable relative to the remainder of the frame about an axis generally parallel to the side of the frame to which that flange is attached or forms part. The flange may be provided with an extension, depression of which causes the angular movement necessary to insert or release the disc to occur.

Although the embodiments described above and shown in the drawings utilise diametrically opposed pairs of moveable flanges (7,8) nevertheless it will be readily appreciated that only one such flange may be moveable and the other may be fixed, and indeed it will also be appreciated they may not be diametrically opposed and could, for example, be disposed at a position slightly in excess of 90° to each other relative to the central axis of the disc. Similarly, although a rectangular portable disc holder is shown of size corresponding to a standard CD disc holder nevertheless it will be appreciated that other shapes may be adopted without departing from the spirit or scope of the invention.

What is claimed is:

1. A portable disc holder, the holder comprising a frame member adapted to surround a circumference of a disc and being at least partially in contact therewith, the frame member being provided with recesses and a first integral flange means for preventing or inhibiting, in conjunction with the recesses, movement of the disc in the direction perpendicular to a plane thereof, and remote from the first flange means on a generally opposite portion of the frame member a resiliently moveable second integral flange means adapted to restrain, in conjunction with the recesses, movement in the direction perpendicular to the plane thereof of an adjacent edge portion of the disc when the disc is mounted in the frame member, the resiliently moveable second flange means permitting entry of the disc into the frame member following resiliently deformation of the second flange means, the holder further comprising a closed slot formed in the frame member adjacent to the second flange means, whereby the second flange means is resiliently movable by virtue of the closed slot.

2. A disc holder as claimed in claim 1, wherein the first flange means remote from the resiliently moveable second flange means is also resiliently moveable.

3. A disc holder as claimed in claim 1, wherein the resiliently moveable flange means is angularly moveable to permit entry or removal of the disc.

4. A disc holder as claimed in any claim 1, wherein the frame member has a back cover and a hinged front cover.

5. A disc holder as claimed in claim 4, wherein the hinged front cover carries a projection at or near a leading edge thereof cooperable with a correspondingly shaped recess in the frame such that front cover can be closed in a snap-fit and released in the same way.

6. A disc holder as claimed in claim 1, wherein the disc holder is provided with a separate sleeve into which the disc holder and a disc may be inserted.

* * * * *